(12) United States Patent
Chen et al.

(10) Patent No.: US 11,192,096 B2
(45) Date of Patent: Dec. 7, 2021

(54) HIGH SILICA AEI ZEOLITE

(71) Applicant: Johnson Matthey Public Limited Company, London (GB)

(72) Inventors: Hai-Ying Chen, Wayne, PA (US); Joseph Fedeyko, Wayne, PA (US); Raul Francisco Lobo, Newark, DE (US); Trong Dinh Pham, Wayne, PA (US); Sanyuan Yang, Savannah, GA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 16/946,794

(22) Filed: Jul. 7, 2020

(65) Prior Publication Data

US 2020/0360906 A1     Nov. 19, 2020

Related U.S. Application Data

(63) Continuation of application No. 15/718,014, filed on Sep. 28, 2017, now Pat. No. 10,737,252.

(Continued)

(51) Int. Cl.
    *C01B 39/48*      (2006.01)
    *B01J 29/70*      (2006.01)
    (Continued)

(52) U.S. Cl.
    CPC ............ *B01J 29/76* (2013.01); *B01D 53/944* (2013.01); *B01D 53/9418* (2013.01); *B01D 53/9422* (2013.01); *B01J 29/70* (2013.01); *B01J 35/0006* (2013.01); *B01J 35/04* (2013.01); *B01J 37/0018* (2013.01); *B01J 37/04* (2013.01); *B01J 37/10* (2013.01); *B01J 37/30* (2013.01); *C01B 39/48* (2013.01); *B01D 2255/2092* (2013.01); *B01D 2255/30* (2013.01); *B01D 2255/50* (2013.01); *B01D 2255/91* (2013.01);
    (Continued)

(58) Field of Classification Search
    CPC ....... C01B 39/48; C01P 2004/03; B01J 29/70; B01J 29/76
    See application file for complete search history.

(56) References Cited

U.S. PATENT DOCUMENTS

5,254,514 A    10/1993   Nakagawa
5,958,370 A    9/1999   Zones et al.
(Continued)

FOREIGN PATENT DOCUMENTS

JP     2015134698 A    7/2015
JP     2016050142 A    4/2016
(Continued)

OTHER PUBLICATIONS

Martin etal, "Efficient Synthesis of the Cu-SSZ-39 catalyst for DeNOx applications", ChemComm, 2015, 51, 11030 (Jun. 2015) (Year: 2015).*

(Continued)

*Primary Examiner* — David M Brunsman (57) ABSTRACT

Provided are a novel form of AEI zeolite, a novel synthesis technique for producing pure phase AEI zeolite, a catalyst comprising the AEI zeolite in combination with a metal, and methods of using the same. The AEI aluminosilicate zeolite has a cuboid morphology and a silica-to-alumina ratio of 20 to 50.

10 Claims, 3 Drawing Sheets

Related U.S. Application Data (60) Provisional application No. 62/402,736, filed on Sep. 30, 2016.

(51) Int. Cl.

| | | |
|---|---|---|
| *B01J 29/76* | (2006.01) | |
| *B01D 53/94* | (2006.01) | |
| *B01J 35/00* | (2006.01) | |
| *B01J 35/04* | (2006.01) | |
| *B01J 37/00* | (2006.01) | |
| *B01J 37/04* | (2006.01) | |
| *B01J 37/10* | (2006.01) | |
| *B01J 37/30* | (2006.01) | |
| *F01N 3/022* | (2006.01) | |
| *F01N 3/035* | (2006.01) | |
| *F01N 3/08* | (2006.01) | |
| *F01N 3/10* | (2006.01) | |
| *F01N 3/20* | (2006.01) | |

(52) U.S. Cl.
CPC ...... *B01J 2229/183* (2013.01); *B01J 2229/34* (2013.01); *C01P 2002/72* (2013.01); *C01P 2004/03* (2013.01); *F01N 3/0222* (2013.01); *F01N 3/035* (2013.01); *F01N 3/0814* (2013.01); *F01N 3/0842* (2013.01); *F01N 3/103* (2013.01); *F01N 3/2066* (2013.01); *F01N 2330/02* (2013.01); *F01N 2370/04* (2013.01)

(56) References Cited

U.S. PATENT DOCUMENTS

| | | |
|---|---|---|
| 2014/0271426 A1 | 9/2014 | Casci et al. |
| 2016/0122192 A1 | 5/2016 | Dusselier et al. |

FOREIGN PATENT DOCUMENTS

| | | |
|---|---|---|
| JP | 2016516565 A | 6/2016 |
| JP | 2016166124 A | 9/2016 |
| WO | 2014141200 A1 | 9/2014 |
| WO | 2015084834 A1 | 6/2015 |
| WO | 2016166245 A1 | 10/2016 |

OTHER PUBLICATIONS

Martin etal, "Efficient Synthesis of the Cu-SSZ-39 catalyst for DeNOx applications", Electronic Supplementary Information (ESI) (Jun. 2015) (Year: 2015).*

Moliner et al., "Cu-SSZ-39, an active and hydrothermally stable catalyst for the selective catalytic reduction of NOx", ChemComm 2012,48,8264-8266 (Jun. 2012) (Year: 2012).*

Moliner et al., "Cu-SSZ-39, an active and hydrothermal ly stable catalyst for the selective catalytic reduction of NOx" Electronic Supplementary Information (ESI) (Jun. 2012) (Year: 2012).*

Wagner et al , "Guest/Host Relationships in the Synthesis of the Novel Cage-Based Zeolites SSZ-35, SSZ-36, and SSZ-39", J. Am. Chem. Soc. 2000, 122, 2, 263-273. Publication Date:Dec. 31, 1999. https://doi.org/10.1021/ja990722u. Copyright 2000 (Year: 2000).*

Xray Powder Pattern generated for AIPO_18, calcined. Downloaded Jan. 21, 2021 (one page) (Year: 2021).*

Wolfram Mathworld, "Cuboid" https://mathworld.wolfram.com/Cuboid.html downloaded May 18, 2021 (Year: 2021).*

\* cited by examiner

HIGH SILICA AEI ZEOLITE

CROSS REFERENCE TO RELATED APPLICATIONS

This application is a continuation application of U.S. patent application Ser. No. 15/718,014, filed Sep. 28, 2017, now U.S. Pat. No. 10,737,252. which claims the benefit of and priority to U.S. Provisional Patent Application No. 62/402,736, filed Sep. 30, 2016, each of which are incorporated herein by reference.

FIELD OF THE INVENTION

The present invention relates to a novel form of AEI zeolite with a cuboid morphology, to novel methods for synthesizing AEI zeolites, and to the use of such zeolites as catalysts for treating combustion exhaust gas.

BACKGROUND OF THE INVENTION

Zeolites are molecular sieves having unique lattice frameworks constructed of alumina and silica cages. The Internal Zeolite Association (IZA) assigns each unique framework type a three-letter code, such as MOR, CHA, or BEA. Zeolites have numerous industrial applications, and zeolites of certain frameworks, such as AEI, are known to be effective catalyst for treating combustion exhaust gas in industrial applications including internal combustion engines, gas turbines, coal-fired power plants, and the like. In one example, nitrogen oxides ($NO_x$) in the exhaust gas can be controlled through a so-called selective catalytic reduction (SCR) process whereby $NO_x$ compounds in the exhaust gas are contacted with a reducing agent in the presence of a zeolite catalyst.

Synthetic AEI zeolites are produced using a structure directing agent (SDA, SDA cations are referred to as SDA$^+$), also referred to as a "template" or "templating agent". SDAs are typically complex organic molecules which guide or direct the molecular shape and pattern of the zeolite's framework. Generally, the SDA serves as a mold around which the zeolite crystals form. After the crystals are formed, the SDA is removed from the interior structure of the crystals, leaving a molecularly porous aluminosilicate cage.

In typical synthesis techniques, solid zeolite crystals precipitate from a reaction mixture which contains the framework reactants (e.g., a source of silica and a source of alumina), a source of hydroxide ions (e.g., NaOH), and an SDA. Such synthesis techniques usually take several days (depending on factors such as crystallization temperature) to achieve the desired crystallization. When crystallization is complete, the solid precipitate containing the zeolite crystals is filtered off. Conventional methods for synthesizing zeolite AEI have a relatively poor yield on silica (a key component of the reaction mixture). Accordingly, it would be desirable to increase the relative yield on silica of the synthesis process and certain aspects of this invention satisfy this need amongst others.

SUMMARY OF THE INVENTION

Through intensive research and studies, the inventors have discovered a novel zeolite synthesis technique and a novel form of AEI zeolite having a cuboid morphology. In particular, the AEI zeolite has a silica-to-alumina ratio and crystalline size that is particularly useful as a catalyst for selective catalytic reduction (SCR) of $NO_x$ in exhaust gas from lean burn engines.

Accordingly, provided is an aluminosilicate zeolite comprising at least about 90% phase pure AEI framework, wherein the aluminosilicate zeolite has a cuboid morphology.

Also provided is a method for making an aluminosilicate zeolite having an AEI framework comprising the step of reacting a synthesis gel comprising at least one zeolite, a structure directing agent, and an optional additional silica source at a temperature of at least about 100° C. until crystals of AEI zeolite form.

In addition, provided is a catalyst for treating an exhaust gas comprising a pure-phase aluminosilicate AEI zeolite, with a cuboid morphology, loaded with a metal selected from V, Cr, Mn, Fe, Co, Ni, Cu, Zn, Mo, Ru, Rh, Pd, Ag, W, Re, Os, Ir, Pt, and Au.

Also provided is a method for using such a catalyst to treat an exhaust gas, for example by selectively reducing $NO_x$, by storing $NO_x$, or by oxidizing one or more of CO, hydrocarbons, and $NH_3$. Such catalysts are preferably supported on a wall-flow filter or a honeycomb flow-through support.

DETAILED DESCRIPTION OF THE INVENTION

One aspect of the present disclosure is directed to an aluminosilicate zeolite comprising at least about 90% phase pure AEI framework, wherein the aluminosilicate zeolite has a cuboid morphology.

AEI zeolites of the present invention are pure phase. As used herein, the term "AEI" refers to an AEI framework type as recognized by the International Zeolite Association (IZA) Structure Commission.

The term "zeolite" refers to an aluminosilicate molecular sieve having a framework composed primarily of alumina and silica moieties, and thus does not include other isotypes such as SAPOs, AlPOs, and the like.

As used herein, the term "pure phase" means that at least about 90 percent of the zeolite framework is type AEI. The AEI zeolite can contain at least about 95 percent, or even at least about 97 percent of the AEI framework crystallinity. The AEI zeolite can be substantially free of other crystalline phases and typically it is not an intergrowth of two or more framework types. As used herein, the term "percent" in connection with the zeolite framework means:

$$\text{percent crystallinity} = I_{crystalline}/(I_{crystalline} + I_{amorphous})$$
$$(I = \text{intensity}).$$

The impurities can be amorphous, different crystalline phases, or different framework types (e.g., undissolved FAU, and/or ITE).

The crystals of the AEI framework can have a ratio of length to height of about 3:1 to about 1:1, about 2:1 to about 1:1, or about 1.5:1 to about 1:1.

The crystals of the AEI framework can have a ratio of length to width of about 2:1 to about 1:1, about 2:1 to about 1.5:1, or about 1.5:1 to about 1:1.

The crystals of the AEI framework can have a ratio of height:length:width of about 1:3:3 to about 1:1:1.

Inventors have discovered certain means for increasing the relative yield on silica and/or SDA in an AEI zeolite synthesis process. As used herein, the term "relative yield" with respect to a chemical reactant, means the amount of the reactant (or derivative thereof) that is incorporated into a desired product as a fraction of the total amount of reactant introduced into the chemical process. Thus, the relative yield of a reactant can be calculated as follows:

(Relative Yield)$R=(R_P)/(R_T)$ where R is the reactant, $R_P$ is the total weight of reactant R (or derivative thereof) incorporated into the desired product, and $R_T$ is total weight of reactant R introduced into the chemical process. Here, the relative yield serves to measure the effectiveness of the chemical process in utilizing the reactant.

The term "overall relative yield" means the relative yield for a chemical process as a whole, including for example, multiple sequential zeolite synthesis batch reactions. Thus, the overall relative yield on silica represents the total amount of silica that is incorporated into the total amount of zeolite produced across one or more sequential batches (vis-à-vis the amount of silica remaining in a discarded mother liquor) relative to the total amount of silica introduced into the process as a whole. The total amounts of these materials typically correspond to the material's total weight.

The AEI zeolite can be substantially free of large pore frameworks.

The AEI zeolite can be substantially free of medium pore frameworks.

The AEI zeolite can be substantially free of FAU framework, the framework of zeolite Y.

As used herein, the term "substantially free of" means that the zeolite contains less than about 10, 8, 6, 4, 2, or 1 percent of the named framework impurity.

As used herein, the term "large pore" means a framework having a maximum ring size of at least 12 tetrahedral atoms, "medium pore" means a framework having a maximum ring size of at least 10 tetrahedral atoms, and the term "small pore" means a framework having a maximum ring size of at least 8 tetrahedral atoms.

The aluminosilicate zeolite can be substantially free of extra framework phosphorus.

The aluminosilicate zeolite can have a phosphorus to aluminum (P/Al) ratio of less than about 1:4, 1:5, 1:10, 1:20, or 1:50.

The AEI zeolite of the present invention typically has a silica-to-alumina molar ratio (SAR) of at least about 15. Preferably, the AEI zeolite of the present invention has an SAR of at least about 20, 22, 25, or 30. The SAR can be in the range of about 20 to about 50, such as about 20 to about 25, about 25 to about 30, or about 30 to about 50.

SAR is based on the synthesized zeolite crystal and not the starting synthesis gel. The silica-to-alumina ratio of a zeolite can be determined by conventional analysis. This ratio is meant to represent, as closely as possible, the ratio in the rigid atomic framework of the zeolite crystal and to exclude silicon or aluminum in the binder or in cationic or other form within the channels. Since it can be difficult to directly measure the silica to alumina ratio of zeolite after it has been combined with a binder material, particularly an alumina binder, the silica-to-alumina ratio is expressed in terms of the SAR of the zeolite per se, i.e., prior to the combination of the zeolite with the other catalyst components. The SAR is typically a molar ratio.

The AEI zeolite crystals of the present invention preferably can each independently have a mean crystal size and/or a $D_{90}$ crystal size of at least about 100 nm, about 150 nm, or about 200 nm.

Typically, the AEI zeolite crystals have a mean crystal size of about 0.1 μm to about 7 μm, such as about 0.1 μm to about 1 μm, about 0.2 μm to about 0.5 μm, about 0.5 μm to about 2.5 μm or about 2.5 μm to about 6 μm.

Additionally, or alternatively, the AEI zeolite crystals can have a $D_{90}$ crystal size of about 0.1 μm to about 7 μm, such as about 0.1 μm to about 1 μm, about 0.2 μm to about 0.5 μm, about 0.5 μm to about 2.5 μm or about 2.5 μm to about 6 μm.

The crystal size is based on individual crystals (including twinned crystals) but does not include agglomerations of crystals. Crystal size is the length of longest diagonal of the three dimensional crystal. Direct measurement of the crystal size can be performed using microscopy methods, such as SEM and TEM. For example, measurement by SEM involves examining the morphology of materials at high magnifications (typically 1000× to 10,000×). The SEM method can be performed by distributing a representative portion of the zeolite powder on a suitable mount such that individual particles are reasonably evenly spread out across the field of view at 1000× to 10,000× magnification. From this population, a statistically significant sample of random individual crystals (e.g., 50-200) are examined and the longest diagonal of the individual crystals are measured and recorded. Particles that are clearly large polycrystalline aggregates should not be included the measurements. Based on these measurements, the arithmetic mean of the sample crystal sizes is calculated.

The AEI crystals can be milled to adjust the composition's particle size. Alternatively, the AEI crystals are unmilled.

The aluminosilicate zeolite can further comprise an alkaline earth metal. Examples of suitable alkaline earth metals include, but are not limited to, Sr, Ba, Ca, and a combination thereof. The alkaline earth metal is preferably selected from the group consisting of Sr, Ba, and a combination thereof.

The molar ratio of alkaline earth metal to alumina in the aluminosilicate zeolite can be less than about 0.1.

The aluminosilicate zeolite can further comprise an alkaline metal. Examples of suitable alkaline metals include, but are not limited to, Na, K, and a combination thereof. The alkaline metal is preferably selected from the group consisting of Na, K, and a combination thereof. More preferably, the alkaline metal is Na.

The aluminosilicate zeolite can have a ratio, preferably a molar ratio, of the alkaline metal oxide to alumina (e.g. $Na_2O/Al_2O_3$) of not more than about 0.5, about 0.25, or about 0.1.

The ratio, preferably the molar ratio, of the alkaline metal to alumina can also be about 1:2 to about 2:1.

The aluminosilicate zeolite can further comprise an alkaline earth metal and an alkaline metal.

The aluminosilicate zeolite can be substantially free of alkaline metal. The aluminosilicate zeolite preferably comprises less than about 4, 3, 2, or 1% alkaline metal. Unless otherwise specified, all compositional percentages used herein are based on weight.

Another aspect of the present disclosure is directed to a method for making an aluminosilicate zeolite having an AEI framework. The method comprises reacting a synthesis gel comprising at least one zeolite, which is both an alumina and a silica source, a structure directing agent, and an optional additional silica source at a temperature of at least about 100° C. until crystals of AEI zeolite form.

The AEI zeolite crystals can be at least about 90, 95, or 97% phase pure.

The AEI zeolite crystals can have an SAR of about 20 to about 50, about 20 to about 25, about 25 to about 30, or about 30 to about 50.

The AEI zeolites of the present invention can be preferably prepared with an organic SDA. Examples of suitable organic SDA cations include, but are not limited to, N,N-diethyl-cis 2,6-dimethylpiperidium, and N,N-dimethyl-3,5-dimethylpiperidium. The SDA cation is preferably N,N-diethyl-cis 2,6-dimethylpiperidium.

The SDA can be substantially free of phosphorus, preferably, phosphorus free.

The SDA cation of the present disclosure is typically associated with anions which can be any anion that is not detrimental to the formation of the zeolite. Representative anions include elements from Group 17 of the Periodic Table (e.g., fluoride, chloride, bromide and iodide), hydroxide, acetate, sulfate, tetrafluoroborate, carboxylate, and the like.

The zeolite synthesis can be performed in the presence of halogens, such as fluorine.

The zeolite synthesis can be preferably free of halogens, such as fluorine.

The SDA, at least one zeolite and an optional additional silica source can be mixed as prepared as a synthesis gel. The at least one zeolite can be an ammonium-form zeolite, a hydrogen-form zeolite or an alkaline earth metal exchanged zeolite (e.g., $NH_4$-form zeolite Y, H-form zeolite Y, alkaline earth metal exchanged zeolite Y). Examples of the at least one zeolite include, but are not limited to, zeolite Y (e.g., CBV 500, CBV712, CBV720, and CBV760). The at least one zeolite is preferably zeolite Y. More preferably, the zeolite Y has a silica-to-alumina (SAR) ratio of about 5 to about 60. Alternatively, the SAR is at least about 20, 30, 40, or 50. Other zeolites, such as aluminosilicates having a BEA* or a GME framework, can be used. The at least one zeolite in the reaction mixture can have a lower framework density than the aluminosilicate zeolite product. The framework density is defined as the number of tetrahedral atoms per 1,000 Å$^3$.

Examples of suitable additional silica sources include, but are not limited to, sodium silicate, silica powders such as Cabosil M5, tetraalkyl silicates such as tetraethyl orthosilicate (TEOS).

The synthesis gel can further comprise an alkaline earth metal source. Examples of suitable alkaline earth metal sources include, but are not limited to, $Sr(OH)_2$, $Ba(OH)_2$, $Ca(OH)_2$, Sr exchanged zeolite (e.g., Sr-zeolite Y), and Ba exchanged zeolite (e.g., Ba-zeolite Y).

The alkaline earth metal cation is typically selected from the group consisting of Sr, Ba, and a combination thereof.

The at least one zeolite can be an alkaline earth metal exchanged zeolite (e.g., Ba-Zeolite Y, Sr-Zeolite Y), wherein the at least one zeolite can also be an alkaline earth metal source of the synthesis gel.

The alkaline earth metal cation of the present disclosure is typically associated with at least one anion which can be any anion that is not detrimental to the formation of the zeolite. Representative anions include elements from Group 17 of the Periodic Table (e.g., fluoride, chloride, bromide and iodide), hydroxide, acetate, sulfate, tetrafluoroborate, carboxylate, and the like.

The synthesis gel can further comprise an alkaline metal source. Examples of suitable alkaline metal sources include, but are not limited to, NaOH, KOH. The alkaline metal is typically selected from the group consisting of Na, K, and a combination thereof.

The synthesis gel can further comprise an alkaline earth metal source and an alkaline metal source.

The synthesis gel can be substantially free of alkaline metal. Typically, the synthesis gel comprises less than about 4, 3, 2, or 1% of the alkaline metal. Typically, the alkaline metal is Na.

The at least one zeolite can be the only silica and aluminum source to form the AEI zeolite.

The at least one zeolite in the synthesis gel can comprise two or more zeolites. The two or more zeolites can have the same framework, such as FAU and have different silica-to-alumina ratios. Different zeolites Y are examples of this.

The synthesis gel can have a molar ratio of $SDA_2O/Al_2O_3$ of at least about 3. The synthesis gel can have a molar ratio of $SDA_2O/Al_2O_3$ of about 3 to about 10.

The synthesis gel can have one or more, two or more, three or more, four or more, or all five of the following compositional molar ratios:

$SiO_2/Al_2O_3$ of about 20 to about 60;
$Na_2O/Al_2O_3$ of about 0.5 to about 2;
$SDA_2O/Al_2O_3$ of about 3 to about 10;
$H_2O/Al_2O_3$ of about 600 to about 2500;
$OH^-/SiO_2$ of about 0.4 to about 0.6.

The synthesis gel can be heated to a temperature greater than 100° C., for example about 120 to about 180° C., or about 140 to about 160° C., for a period of time sufficient to form zeolite crystals.

The hydrothermal crystallization process is typically conducted under pressure, such as in an autoclave, and is preferably under autogenous pressure.

The reaction mixture can be stirred during crystal formation.

The reaction time is typically about 2 to about 15 days, for example about 4 to about 6 days.

To improve selectivity for AEI and/or to shorten the crystallization process, the reaction mixture can be seeded with AEI crystals. The AEI crystals can also be allowed to nucleate spontaneously from the reaction mixture.

The synthesis can be performed in the absence of the seeded AEI crystals.

Once the AEI zeolite crystals have formed, the solid product can be separated from the mother liquor by standard mechanical separate techniques, such as filtration.

The recovered solid product is then washed and dried.

The crystals can be thermally treated to remove the SDA, thus providing the AEI zeolite product.

The AEI zeolite crystals can also be calcined.

The relative yield based on silica can be at least about 30%, 40%, 50%, 60%, 70%, 80%, or 90%. The relative yield can also be at least about 95, 96, 97, or 98%.

The yield based on silica in a single synthesis batch can be at least about 30%, 40%, 50%, 60%, 70%, 80%, or 90%. The yield in a single synthesis batch can also be at least about 95, 96, 97, or 98%.

The AEI zeolite can be used as a catalyst for various processes, such as treatment of combustion exhaust gas, hydrocarbon cracking, and conversion of methanol to an olefin (MTO), or conversion of methane to methanol.

Treatable exhaust gases include those generated by lean burn combustion, such as exhaust from diesel engines, gas turbines, power plants, lean burn gasoline engines, and engines burning alternative fuels such as methanol, CNG, and the like. Other treatable exhaust gases include those generated by rich burn engines, such as gasoline engines.

The AEI zeolites can also be used in other chemical processes such as water treatment.

For the abovementioned processes, the AEI zeolite is preferably used in heterogeneous catalytic reaction systems (i.e., solid catalyst in contact with a gas reactant). To improve contact surface area, mechanical stability, and/or fluid flow characteristics, the catalysts can be disposed on and/or within a large surface area substrate, such a porous substrate.

Generally, a washcoat containing the catalyst can be applied to a substrate (i.e. an inert substrate), such as corrugated metal plate, pellets, a flow-through honeycomb (e.g. a flow-through honeycomb cordierite or flow-through honeycomb aluminatitanate (AT) brick), or a honeycomb wall-flow filter. Alternatively, the catalyst can be kneaded along with other components such as a filler, a binder, and a reinforcing agent, into an extrudable paste which is then extruded through a die to form a honeycomb brick.

Accordingly, the invention also provides a catalyst article comprising a metal-promoted AEI zeolite catalyst described herein coated on and/or incorporated into a substrate.

An AEI zeolite according to the present invention can be used in combination with a promoter metal. The promoter metal can include: (a) transition metals such as copper, nickel, zinc, iron, tungsten, molybdenum, cobalt, titanium, zirconium, manganese, chromium, vanadium, niobium, tin, bismuth, and antimony; (b) platinum group metals, such as ruthenium, rhodium, palladium, indium, platinum, and (c) precious metals such as gold or silver. Preferred transition metals are base metals, and preferred base metals include those selected from the group consisting of chromium, manganese, iron, cobalt, nickel, and copper, and mixtures thereof. Preferably, at least one of the promoter metals is copper. Other preferred promoter metals include iron, particularly in combination with copper. Preferred metals for converting hydrocarbons and selective reduction of $NO_x$ in exhaust gas include Cu and Fe. Particularly useful metals for oxidizing CO, hydrocarbons, and/or ammonia are Pt and Pd.

The metal used in combination with the AEI zeolite is preferably a promoter metal disposed on and/or within the zeolite material as extra-framework metals. As used herein, an "extra-framework metal" is one that resides within the molecular sieve and/or on at least a portion of the molecular sieve surface, preferably as an ionic species, does not include aluminum, and does not include atoms constituting the framework of the molecular sieve. Preferably, the presence of the promoter metal(s) facilitates the treatment of exhaust gases, such as exhaust gas from a diesel engine, including processes such as $NO_x$ reduction, $NH_3$ oxidation, and $NO_x$ storage.

The promoter metal can be present in the zeolite material at a concentration of about 0.1 to about 10 weight percent (wt %) based on the total weight of the zeolite, for example from about 0.5 wt % to about 5 wt %, from about 0.5 to about 1 wt %, from about 1 to about 5 wt %, or about 2.5 wt % to about 3.5 wt %. When copper, iron, or the combination thereof, are used, the concentration of these transition metals in the zeolite material is preferably about 1 to about 5 weight percent, more preferably about 2.5 to about 3.5 weight percent.

The promoter metal can be present in an amount relative to the amount of aluminum in the framework of the zeolite. As used herein, the promoter metal:aluminum (M:Al) ratio is based on the relative molar amount of promoter metal to molar framework Al in the corresponding zeolite. Typically, the catalyst material has a M:Al ratio of about 0.1 to about 1.0, preferably about 0.2 to about 0.5. An M:Al ratio of about 0.2 to about 0.5 is particularly useful where M is copper, and more particularly where M is copper and the SAR of the zeolite is about 20 to about 25.

Incorporation of Cu can occur during synthesis or after synthesis. A metal-exchanged zeolite can incorporate copper during synthesized by using ionic copper in the reaction mixture. After synthesis incorporation can be performed, for example, by ion exchange or impregnation. The metal-exchanged zeolite can then be washed, dried, and calcined.

Generally, ion exchange of the catalytic metal cation into or on the molecular sieve can be carried out at room temperature or at a temperature up to about 80° C. over a period of about 1 to 24 hours. The pH of the mixture when performing ion exchange can typically be about 7, but can be adjusted to provide higher levels of exchange. The resulting catalytic molecular sieve material is preferably dried at about 100 to about 120° C. and then calcined at a temperature of at least about 500° C.

The catalyst composition can comprise the combination of at least one promoter metal and at least one alkali or alkaline earth metal, wherein the transition metal(s) and alkali or alkaline earth metal(s) are disposed on or within the zeolite material. The alkali or alkaline earth metal can be selected from sodium, potassium, rubidium, cesium, magnesium, calcium, strontium, barium, or some combination thereof. As used here, the phrase "alkali or alkaline earth metal" does not mean the alkali metals and alkaline earth metals are used in the alternative, but instead that one or more alkali metals can be used alone or in combination with one or more alkaline earth metals and that one or more alkaline earth metals can be used alone or in combination with one or more alkali metals. Typically, alkali metals are preferred. Alternatively, alkaline earth metals are preferred. Preferred alkali or alkaline earth metals include calcium, potassium, and combinations thereof.

The catalyst composition can be essentially free of magnesium and/or barium.

The catalyst can be essentially free of any alkali or alkaline earth metal except calcium and potassium.

The catalyst can be essentially free of any alkali or alkaline earth metal except calcium.

The catalyst can be essentially free of any alkali or alkaline earth metal except potassium.

As used herein, the term "essentially free" with respect to metal means that the material does not have an appreciable amount of the particular metal. That is, the particular metal is not present in amount that would affect the basic physical and/or chemical properties of the material, particularly with respect to the material's capacity to selectively reduce or store $NO_x$.

The zeolite material can have a post-synthesis alkali content of less than about 3 weight percent, more preferably less than 1 weight percent, and even more preferably less than about 0.1 weight percent. Here, post-synthesis alkali content refers to the amount of alkali metal occurring in the zeolite as a result of synthesis (i.e., alkali derived from the synthesis starting materials) and does not include alkali metal added after synthesis.

The metal promoted zeolite catalysts of the present invention can also contain a relatively large amount of cerium (Ce). Typically, the cerium concentration in the catalyst material is present in a concentration of at least about 1 weight percent, based on the total weight of the zeolite. Examples of preferred concentrations include at least about 2.5 weight percent, at least about 5 weight percent, at least about 8 weight percent, at least about 10 weight percent, about 1.35 to about 13.5 weight percent, about 2.7 to about 13.5 weight percent, about 2.7 to about 8.1 weight percent, about 2 to about 4 weight percent, about 2 to about 9.5 weight percent, and about 5 to about 9.5 weight percent, based on the total weight of the zeolite.

Typically, the cerium concentration in the catalyst material is about 50 to about 550 $g/ft^3$. Other ranges of Ce include: above 100 $g/ft^3$, above 200 $g/ft^3$, above 300 $g/ft^3$, above 400 $g/ft^3$, above 500 $g/ft^3$, from about 75 to about 350 $g/ft^3$, from about 100 to about 300 $g/ft^3$, and from about 100 to about 250 $g/ft^3$.

Certain aspects of the invention provide a catalytic washcoat. The washcoat comprising the AEI catalyst described herein is preferably a solution, suspension, or slurry. Suitable coatings include surface coatings, coatings that penetrate a portion of the substrate, coatings that permeate the substrate, or some combination thereof.

In general, the production of an extruded solid body containing the metal promoted AEI catalyst involves blending the AEI zeolite and the promoter metal (either separately or together as a metal-exchanged zeolite), a binder, an optional organic viscosity-enhancing compound into a homogeneous paste which is then added to a binder/matrix component or a precursor thereof and optionally one or more of stabilized ceria, and inorganic fibers. The blend is compacted in a mixing or kneading apparatus or an extruder. The mixtures can have organic additives such as binders, pore formers, plasticizers, surfactants, lubricants, and dispersants as processing aids to enhance wetting and produce a uniform batch. The resulting plastic material is then molded, in particular using an extrusion press or an extruder including an extrusion die, and the resulting moldings are dried and calcined. The organic additives are "burnt out" during calcinations of the extruded solid body. A metal-promoted AEI zeolite catalyst can also be washcoated or otherwise applied to the extruded solid body as one or more sub-layers that reside on the surface or penetrate wholly or partly into the extruded solid body. Alternatively, a metal-promoted AEI zeolite can be added to the paste prior to extrusion.

Extruded solid bodies containing metal-promoted AEI zeolites according to the present invention generally comprise a unitary structure in the form of a honeycomb generally having uniform-sized and parallel channels extending from a first end to a second end thereof. Alternatively, the channels can be of two or more different sizes. Channel walls defining the channels are porous. Typically, an external "skin" surrounds a plurality of the channels of the extruded solid body. The extruded solid body can be formed from any desired cross section, such as circular, square or oval. Individual channels in the plurality of channels can be square, triangular, hexagonal, circular etc. Channels at a first, upstream end can be blocked, e.g. with a suitable ceramic cement, and channels not blocked at the first, upstream end can be blocked at a second, downstream end to form a wall-flow filter. Typically, the arrangement of the blocked channels at the first, upstream end resembles a checker-board with a similar arrangement of blocked and open downstream channel ends.

The binder/matrix component is preferably selected from the group consisting of cordierite, nitrides, carbides, borides, intermetallics, lithium aluminosilicate, a spinel, an optionally doped alumina, a silica source, titania, zirconia, titania-zirconia, zircon and mixtures of any two or more thereof. The paste can optionally contain reinforcing inorganic fibers selected from the group consisting of carbon fibers, glass fibers, metal fibers, boron fibers, alumina fibers, silica fibers, silica-alumina fibers, silicon carbide fibers, potassium titanate fibers, aluminum borate fibers and ceramic fibers.

The alumina binder/matrix component is preferably gamma alumina, but can be any other transition alumina, i.e., alpha alumina, beta alumina, chi alumina, eta alumina, rho alumina, kappa alumina, theta alumina, delta alumina, lanthanum beta alumina and mixtures of any two or more such transition aluminas. It is preferred that the alumina is doped with at least one non-aluminum element to increase the thermal stability of the alumina. Suitable alumina dopants include silicon, zirconium, barium, lanthanides and mixtures of any two or more thereof. Lanthanides suitable as alumina dopants include La, Ce, Nd, Pr, Gd and mixtures of any two or more thereof.

Sources of silica can include a silica sol, quartz, fused or amorphous silica, sodium silicate, an amorphous aluminosilicate, an alkoxysilane, a silicone resin binder, such as methylphenyl silicone resin, a clay, talc or a mixture of any two or more thereof. The silica can be $SiO_2$ as such, feldspar, mullite, silica-alumina, silica-magnesia, silica-zirconia, silica-thoria, silica-berylia, silica-titania, ternary silica-alumina-zirconia, ternary silica-alumina-magnesia, ternary-silica-magnesia-zirconia, ternary silica-alumina-thoria and mixtures of any two or more thereof.

Preferably, the metal-promoted AEI zeolite is dispersed throughout, and more preferably evenly throughout, the entire extruded catalyst body.

Where any of the above extruded solid bodies are made into a wall-flow filter, the porosity of the wall-flow filter can be from 30-80%, such as from 40-70%. Porosity and pore volume can be measured e.g. using mercury intrusion porosimetry.

The metal-promoted AEI catalyst described herein can promote the reaction of a reductant, preferably ammonia, with nitrogen oxides to selectively form elemental nitrogen ($N_2$) and water ($H_2O$). Typically, the catalyst can be formulated to favor the reduction of nitrogen oxides with a reductant (i.e., an SCR catalyst). Examples of such reductants include hydrocarbons (e.g., $C_3$-$C_6$ hydrocarbons) and nitrogenous reductants, such as ammonia, ammonia hydrazine or any suitable ammonia precursor, such as urea (($NH_2$)$_2CO$), ammonium carbonate, ammonium carbamate, ammonium hydrogen carbonate or ammonium formate.

The metal-promoted AEI catalyst described herein can also promote the oxidation of ammonia. The catalyst can be formulated to favor the oxidation of ammonia with oxygen, particularly at concentrations of ammonia typically encountered downstream of an SCR catalyst. The metal-promoted AEI catalyst can be used in an ammonia slip catalyst (ASC) along with an ammonia oxidation (AMOX) catalyst. Typically, the metal-promoted AEI zeolite catalyst is disposed as a top layer over an oxidative under-layer, wherein the under-layer comprises a platinum group metal (PGM) catalyst or a non-PGM catalyst. Preferably, the catalyst component in the underlayer is disposed on a high surface area support, including but not limited to alumina.

SCR and AMOX operations can be performed in series, wherein both processes utilize a catalyst comprising the metal-promoted AEI zeolite described herein, and wherein the SCR process occurs upstream of the AMOX process. For example, an SCR formulation of the catalyst can be disposed on the inlet side of a filter and an AMOX formulation of the catalyst can be disposed on the outlet side of the filter.

Accordingly, provided is a method for the reduction of $NO_x$ compounds or oxidation of $NH_3$ in a gas, which comprises contacting the gas with a catalyst composition described herein for the catalytic reduction of $NO_x$ compounds for a time sufficient to reduce the level of $NO_x$ compounds and/or $NH_3$ in the gas. Typically, a catalyst article having an ammonia slip catalyst is disposed downstream of a selective catalytic reduction (SCR) catalyst. The ammonia slip catalyst oxidizes at least a portion of any nitrogenous reductant that is not consumed by the selective catalytic reduction process. Typically, the ammonia slip catalyst is disposed on the outlet side of a wall flow filter and an SCR catalyst is disposed on the upstream side of a filter. Alternatively, the ammonia slip catalyst is disposed on the downstream end of a flow-through substrate and an SCR catalyst is disposed on the upstream end of the flow-through substrate. The ammonia slip catalyst and SCR catalyst can be disposed on separate substrates (bricks) within the exhaust system. These separate bricks can be adjacent to, and in contact with, each other or separated by a specific distance, provided that they are in fluid communication with each other and provided that the SCR catalyst brick is disposed upstream of the ammonia slip catalyst brick.

The SCR and/or AMOX process can be performed at a temperature of at least 100° C. The process(es) can occur at a temperature from about 150° C. to about 750° C. Preferably the temperature range is from about 175 to about 550° C. or from about 175 to about 400° C. Alternatively, the temperature range is about 450 to about 900° C., preferably about 500 to about 750° C., about 500 to about 650° C., about 450 to about 550° C., or about 650 to about 850° C. Temperatures greater than about 450° C. are particularly useful for treating exhaust gases from a heavy or light duty diesel engine that is equipped with an exhaust system comprising (optionally catalyzed) diesel particulate filters which are regenerated actively, e.g. by injecting hydrocarbon into the exhaust system upstream of the filter, wherein the zeolite catalyst for use in the present invention is located downstream of the filter.

According to another aspect of the invention, provided is a method for the reduction of $NO_X$ compounds and/or oxidation of $NH_3$ in an exhaust gas, which comprises contacting the exhaust gas with a catalyst described herein in the presence of a reducing agent for a time sufficient to reduce the level of $NO_X$ compounds in the gas. These methods can further comprise one or more of the following steps: (a) accumulating and/or combusting soot that is in contact with the inlet of a catalytic filter; (b) introducing a nitrogenous reducing agent into the exhaust gas stream prior to contacting the catalyst in an SCR filter, preferably with no intervening catalytic steps involving the treatment of $NO_x$ and the reductant; (c) generating $NH_3$ over a $NO_x$ adsorber catalyst or lean $NO_x$ trap, and preferably using such $NH_3$ as a reductant in a downstream SCR reaction; (d) contacting the exhaust gas stream with a DOC to oxidize hydrocarbon based soluble organic fraction (SOF) and/or carbon monoxide into $CO_2$, and/or oxidize NO into $NO_2$, which in turn, can be used to oxidize particulate matter in particulate filter; and/or reduce the particulate matter (PM) in the exhaust gas; and (e) contacting the exhaust gas with an ammonia slip catalyst, preferably downstream of the SCR catalyst to oxidize most, if not all, of the ammonia prior to emitting the exhaust gas into the atmosphere or passing the exhaust gas through a recirculation loop prior to exhaust gas entering/re-entering the engine.

All or at least a portion of the nitrogen-based reductant, particularly $NH_3$, for consumption in the SCR process can be supplied by a $NO_X$ adsorber catalyst (NAC), a lean $NO_X$ trap (LNT), or a $NO_X$ storage/reduction catalyst (NSRC), disposed upstream of the SCR catalyst, e.g., a SCR catalyst of the present invention disposed on a wall-flow filter. NAC components useful in the present invention include a catalyst combination of a basic material (such as alkali metal, alkaline earth metal or a rare earth metal, including oxides of alkali metals, oxides of alkaline earth metals, and combinations thereof), and a precious metal (such as platinum), and optionally a reduction catalyst component, such as rhodium. Specific types of basic material useful in the NAC include cesium oxide, potassium oxide, magnesium oxide, sodium oxide, calcium oxide, strontium oxide, barium oxide, and combinations thereof. The precious metal is preferably present at about 10 to about 200 $g/ft^3$, more preferably about 20 to about 60 $g/ft^3$. Alternatively, the precious metal of the catalyst can be present at an average loading of about 40 to about 100 $grams/ft^3$.

Under certain conditions, during the periodically rich regeneration events, $NH_3$ can be generated over a $NO_x$ adsorber catalyst. The SCR catalyst downstream of the $NO_x$ adsorber catalyst can improve the overall system $NO_x$ reduction efficiency. In the combined system, the SCR catalyst is capable of storing the released $NH_3$ from the NAC catalyst during rich regeneration events and utilizes the stored $NH_3$ to selectively reduce some or all of the $NO_x$ that slips through the NAC catalyst during the normal lean operation conditions.

The method for treating exhaust gas as described herein can be performed on an exhaust gas derived from a combustion process, such as from an internal combustion engine (whether mobile or stationary), a gas turbine and coal or oil fired power plants. The method may also be used to treat gas from industrial processes such as refining, from refinery heaters and boilers, furnaces, the chemical processing industry, coke ovens, municipal waste plants and incinerators, etc. Typically, the method is used for treating exhaust gas from a vehicular lean burn internal combustion engine, such as a diesel engine, a lean-burn gasoline engine or an engine powered by liquid petroleum gas or natural gas.

In certain aspects, the invention is a system for treating exhaust gas generated by combustion process, such as from an internal combustion engine (whether mobile or stationary), a gas turbine, coal or oil fired power plants, and the like. Such systems include a catalytic article comprising the metal-promoted AEI zeolite described herein and at least one additional component for treating the exhaust gas, wherein the catalytic article and at least one additional component are designed to function as a coherent unit.

The system can comprise a catalytic article comprising a metal-promoted AEI zeolite described herein, a conduit for directing a flowing exhaust gas, a source of nitrogenous reductant disposed upstream of the catalytic article. The system can include a controller for the metering the nitrogenous reductant into the flowing exhaust gas only when it is determined that the zeolite catalyst is capable of catalyzing $NO_x$ reduction at or above a desired efficiency, such as at or above 100° C., at or above 150° C., or at or above 175° C. The metering of the nitrogenous reductant can be arranged such that 60% to 200% of theoretical ammonia is present in exhaust gas entering the SCR catalyst calculated at 1:1 $NH_3/NO$ and 4:3 $NH_3/NO_2$.

The system can comprise an oxidation catalyst (e.g., a diesel oxidation catalyst (DOC)) for oxidizing nitrogen monoxide in the exhaust gas to nitrogen dioxide can be located upstream of a point of metering the nitrogenous reductant into the exhaust gas. The oxidation catalyst can be adapted to yield a gas stream entering the SCR zeolite catalyst having a ratio of NO to $NO_2$ of from about 4:1 to about 1:3 by volume, e.g. at an exhaust gas temperature at oxidation catalyst inlet of about 250° C. to about 450° C. The oxidation catalyst can include at least one platinum group metal (or some combination of these), such as platinum, palladium, or rhodium, coated on a flow-through monolith substrate. Preferably, the at least one platinum group metal is platinum, palladium or a combination of both platinum and palladium. The platinum group metal can be supported on a high surface area washcoat component such as alumina, a zeolite such as an aluminosilicate zeolite, silica, non-zeolite silica alumina, ceria, zirconia, titania or a mixed or composite oxide containing both ceria and zirconia.

A suitable filter substrate can be located between the oxidation catalyst and the SCR catalyst. Filter substrates can be selected from any of those mentioned above, e.g. wall flow filters. Where the filter is catalyzed, e.g. with an oxidation catalyst of the kind discussed above, preferably the point of metering nitrogenous reductant is located between the filter and the zeolite catalyst. Alternatively, if the filter is un-catalyzed, the means for metering nitrogenous reductant can be located between the oxidation catalyst and the filter.

Although the description above contains many specifics, these are merely provided to illustrate the invention and should not be constructed as limitations of the invention's scope. It should be also noted that many specifics could be combined in various ways in a single or multiple embodiments. Thus it will be apparent to those skilled in the art that various modifications and variations can be made in the processes, catalysts, and methods of the present invention without departing from the spirit or scope of the invention.

EXAMPLES

Materials produced in the examples described below were characterized by one or more of the following analytic methods. Powder X-ray diffraction (PXRD) patterns were collected on a X'pert (Philips) or Bruker D8 powder diffractometer using a CuKα radiation (40-45 kV, 40 mA) at a step size of 0.04° and a 1 s per step between 5° and 40° (2θ). Scanning electron microscopy (SEM) images and chemical compositions by energy-dispersive X-ray spectroscopy (EDX) were obtained on a JEOL JSM7400F and Auriga 60 CrossBeam (FIB/FE-SEM) microscopes, operating at an acceleration voltage of 1.5-3 keV, and a current of 10 μA. The micropore volume and surface area were measured using $N_2$ at 77 K on a 3Flex surface characterization analyzer (Micrometrics).

Reagents: Zeolite Y [CBV500 (SAR~5), CBV712 (SAR~12), CBV720 (SAR~30-32) and CBV760 (SAR~60) from Zeolyst], DI water, $Sr(OH)_2$ (94%, Sigma). NaOH 1N (diluted from NaOH 99% Fisher Scientific), 2,6-N,N-diethyl-cis 2,6-dimethylpiperidium hydroxide (2,6-DMP-OH, 22% wt).

Example 1: Synthesis of SSZ-39 (Following Example 16, Zones et al. U.S. Pat. No. 5,958,370)

A solution of 5 g of sodium silicate (PQ corp., 28.5% $SiO_2$, 8.9% $Na_2O$), 0.4 g of 1N NaOH, and 16.4 g of DI water was added to 3.8 g 2,6-DMP-OH and stirred at room temperature for about 15 minutes. Then, 0.16 g of $NH_4$—Y (Zeolyst CBV500) as aluminum source was added to the solution and stirred for another 30 minutes. The resulting solution was then transferred into 45 ml Teflon-lined autoclaves and heated at a temperature of 135° C. under rotation for 7 days. The solid product was separated by vacuum filtration, washed with DI water, and dried at 80° C. overnight. The as-made product was then calcined in air at 580° C. for 8 hours.

Figure 1:
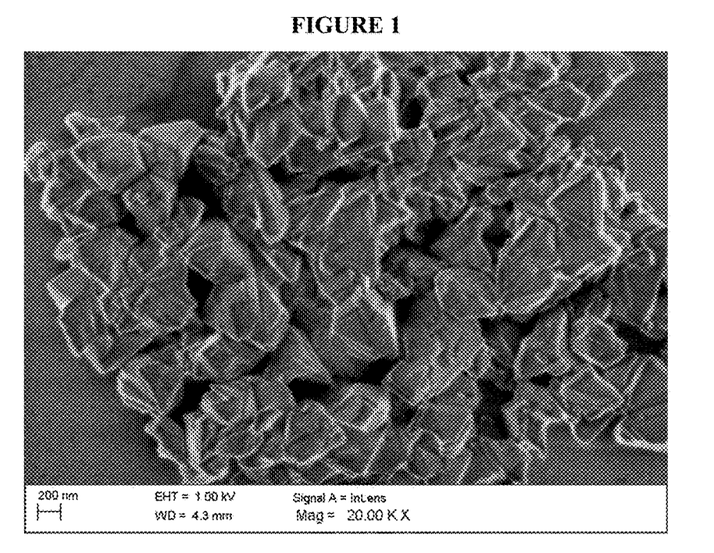
FIG. 1 is an SEM image of the reference AEI zeolite of Example 1 (SSZ-39, SAR~27).

An SEM of the calcined product (FIG. 1) showed that the product did not have a well-defined shape. Particles appear as aggregates of smaller units with triangular shaped edges. The calcined product (SSZ-39) had an SAR of about 27.

Example 2: Synthesis of JMZ-8

9.58 g of 2,6-DMP-OH was mixed with 2.1 g of 1N NaOH and 4.24 g of water. Then, the mixture was stirred for about 5 minutes. 2.16 g of zeolite Y (CBV720) was added under stirring for another 5 minutes. The mixture was then heated at 155° C. under rotation (45 rpm) for 5 days.

TABLE 1

| Synthesis Gel Composition of Example 2 | | | | | |
|---|---|---|---|---|---|
| Components | $H_2O$ | $Al_2O_3$ | $SiO_2$ | NaOH | 2,6-DMP-OH |
| Mole ratios | 24 | 0.0333 | 1 | 0.067 | 0.35 |

To obtain the AEI powder product, the autoclaves were cooled to room temperature in air and the crystalline product was recovered by filtration, washed several times with deionized water and dried at 80° C. overnight in a drying oven. The as-made product (JMZ-8) was calcined at 580° C./8 hours in air with ramping rate of 3° C./min.

Figure 2:
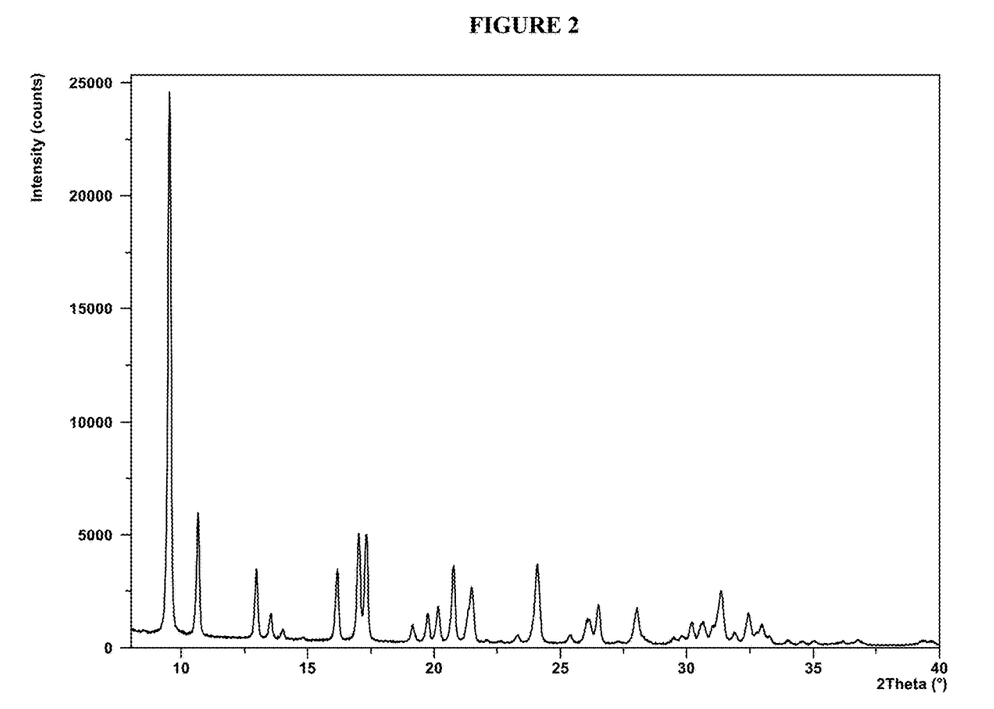
FIG. 2 is an XRD pattern of AEI (SAR~30) prepared in Example 2.

Samples of the dried product were analysed by XRD and SEM as described above. Analysis of the calcined product by powder XRD (FIG. 2) indicated that the product had an AEI structure.

Figure 3A:
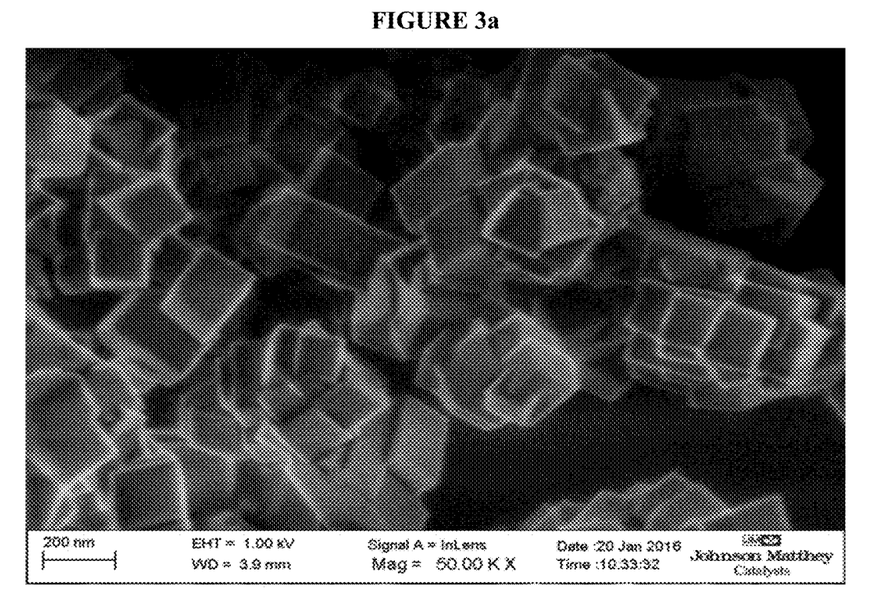
FIG. 3a is an SEM image of AEI (SAR~30) prepared in Example 2.

An SEM of the calcined product showed that the material has cuboid morphology with crystal size of about 0.2 to about 0.5 micron (FIG. 3a). $N_2$ adsorption measurements of the calcined product showed that the product had a BET surfaces area of ~680 $m^2/g$, a pore volume of ~0.27 $cm^3/g$. The calcined product had an SAR of about 30.

Example 3: Synthesis of JMZ-8 in the Presence of Alkaline Earth Metal 10.5 g of 2,6-DMP-OH was mixed with 0.22 g of 1N $Sr(OH)_2$ and 5.8 g of water. Then, the mixture was stirred for about 5 minutes. 2.36 g of zeolite Y (CBV 720, Zeolyst) having an SAR of ~30-32 was added to the mixture under stirring for another 5 minutes. The mixture was then heated at 155° C. under rotation (45 rpm) for 5 days.

TABLE 2

| Synthesis Gel Composition of Example 3 | | | | | |
|---|---|---|---|---|---|
| Components | $H_2O$ | $Al_2O_3$ | $SiO_2$ | $Sr(OH)_2$ | 2,6-DMP-OH |
| Mole ratios | 24 | 0.0333 | 1 | 0.05 | 0.35 |

To obtain the AEI powder product, the autoclaves were cooled to room temperature in air and the crystalline product was recovered by filtration, washed several times with deionized water and dried at 80° C. overnight in a drying oven. The as-made product (JMZ-8) was calcined at 580° C./8 hours in air with ramping rate of 3° C./min.

Figure 3B:
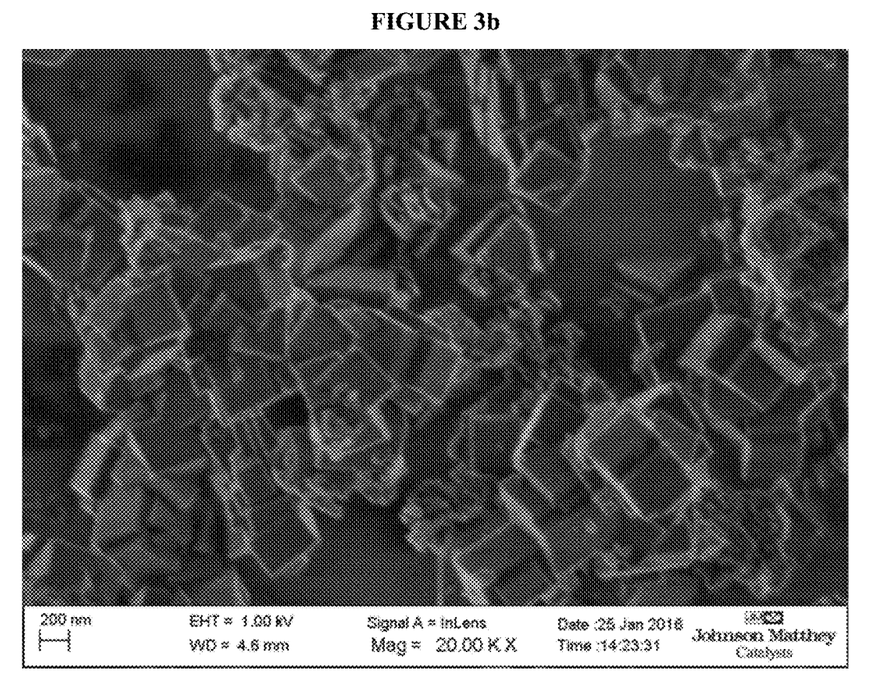
FIG. 3b is an SEM image of AEI (SAR~30) prepared in Example 3.

Samples of the dried product were analysed by XRD, $N_2$ adsorption, EDX, and SEM as described above. Analysis of the as-made product by powder XRD indicated that the product had an AEI structure. An SEM of the calcined product showed that the material has cuboid morphology with crystal size of about 0.2 to about 0.5 micron (FIG. 3b). $N_2$ adsorption measurements of the calcined product showed that the product had a BET surfaces area of ~670 m²/g, a pore volume of ~0.26 cm³/g. The calcined product had an SAR of about 30.

Example 4: SCR Testing on Copper Exchanged Zeolite Catalysts

Synthesis of Copper Exchanged AEI

AEI was first exchanged with a 0.2M $NH_4NO_3$ solution at 80° C. overnight. The sample was then calcined at 550° C./4 h. Finally, ~3% wt of copper exchanged into the calcined AEI zeolite using $Cu(CH_3COO)_2$.

Testing conditions: SV=90K, 500 ppm $NH_3$, 500 ppm NO, 4.6% $H_2O$, 14% $O_2$, 5% $CO_2$ in $N_2$. Ramp 5° C./min.

Figure 4:
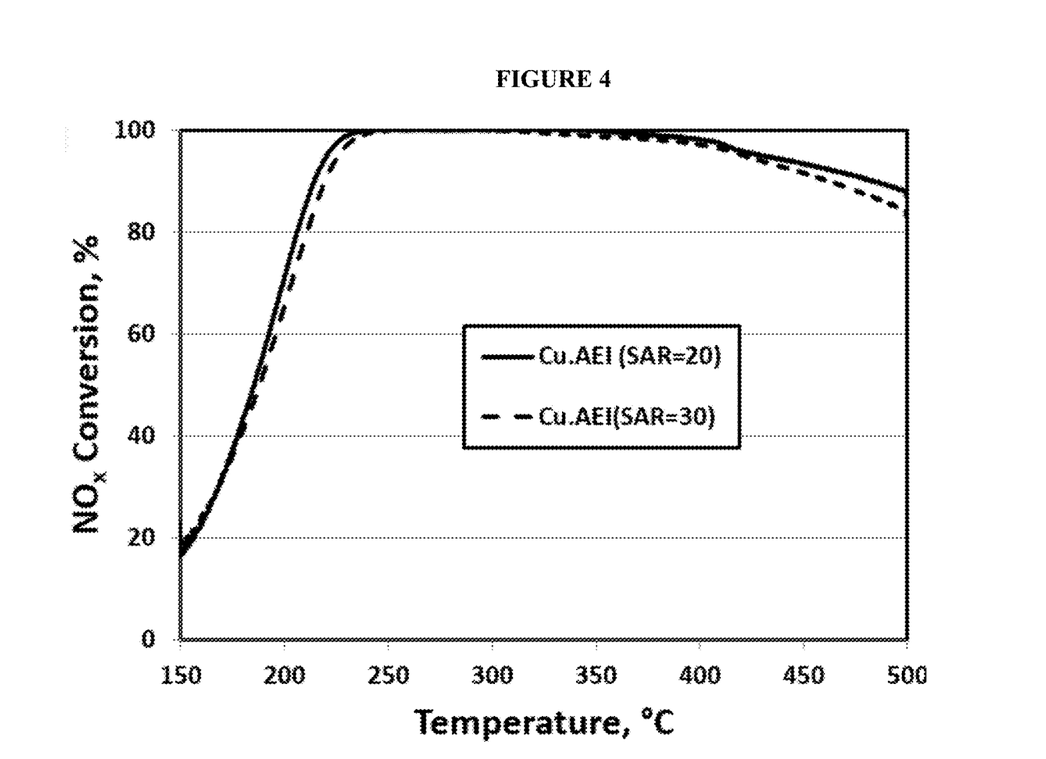
FIG. 4 shows SCR activities of catalysts made from the reference AEI (SAR~20) and high silica AEI (SAR~30, Example 2) of the present invention.
Figure 5:
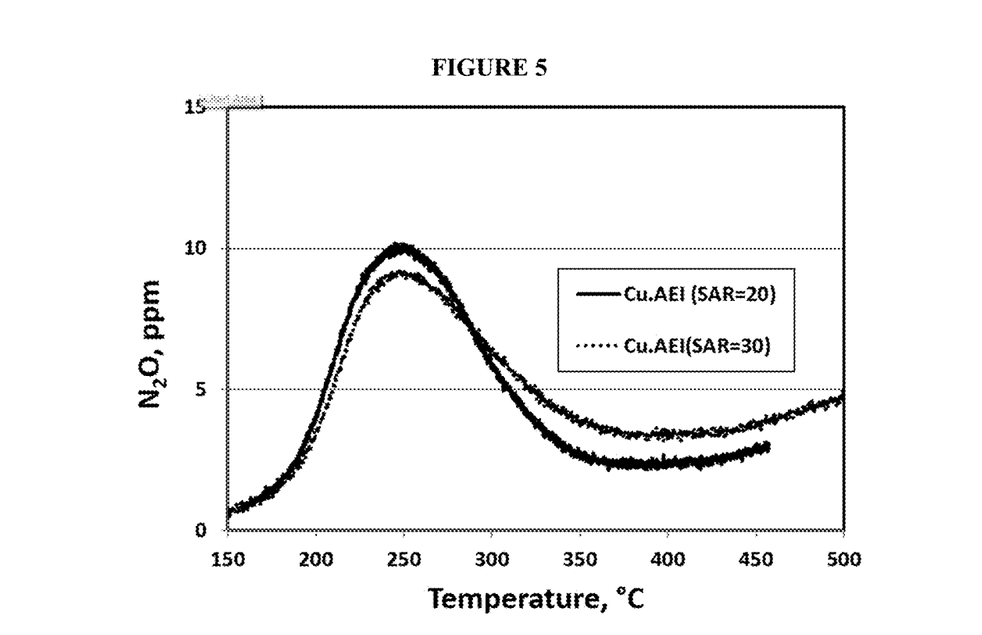
FIG. 5 shows $N_2O$ selectivity of catalysts made from the reference AEI (SAR~20) and high silica AEI (SAR~30, Example 2) of the present invention.

Procedures: Catalyst was initially exposed to full gas mixture with $NH_3$ for 10 min at 150° C. $NH_3$ was switched on and the catalyst is stabilized for 30 min to saturate. Catalyst was then evaluated during a 5° C./min ramp from 150 to 500° C. Catalyst was evaluated at steady state at 500° C. then cooled and evaluated again at steady state at 250° C. FIG. 4 shows $NO_X$ conversions on Cu-AEI (SAR~20) and high silica Cu-AEI (SAR~30, AEI from Example 2), with ~3% wt of copper exchanged into the AEI zeolites. FIG. 5 shows the concentration of $N_2O$ in the gas leaving the test cell containing the catalyst from reference Cu-AEI (SAR~20) and high silica Cu-AEI (SAR~30, Example 2) of the present invention. High silica Cu-AEI (SAR~30) of the present invention demonstrated similar fresh SCR activities as lower silica Cu-AEI (SAR~20), but with less $N_2O$ formation and it shows some advantages on the $N_2O$ selectivity over the catalyst from the reference AEI (SAR~20).

The above examples are set forth to aid in the understanding of the disclosure, and are not intended and should not be construed to limit in any way the disclosure set forth in the claims which follow hereafter. Although illustrated and herein described with reference to certain specific embodiments, the present disclosure is nevertheless not intended to be limited to the details shown, but various modifications may be made therein without departing from the spirit of the disclosure.

The invention claimed is:

1. An aluminosilicate zeolite comprising at least about 90% phase pure AEI framework, wherein the aluminosilicate zeolite has a cuboid morphology, wherein the aluminosilicate zeolite has a silica-to-alumina ratio of 20 to 50.

2. The aluminosilicate zeolite of claim 1, wherein the aluminosilicate zeolite is substantially free of extra framework phosphorus.

3. The aluminosilicate zeolite of claim 1, wherein the aluminosilicate zeolite has a mean crystal size of at, least about 100 urn.

4. The aluminosilicate zeolite of claim 1, wherein the aluminosilicate zeolite has a $D_{90}$ crystal size of about 0.1 μm to about 7 μm.

5. The aluminosilicate zeolite of claim 1, wherein the aluminosilicate zeolite comprises at least about 95% phase pure AEI framework.

6. The aluminosilicate zeolite of claim 1, wherein the aluminosilicate zeolite is substantially free of medium and large pore frameworks.

7. The aluminosilicate zeolite of claim 1, wherein the aluminosilicate zeolite is substantially free of FAU framework.

8. The aluminosilicate zeolite of claim 1, wherein the aluminosilicate zeolite further comprises an alkaline earth metal.

9. The aluminosilicate zeolite of claim 1, wherein the aluminosilicate zeolite has a silica-to-alumina ratio of about 25 to about 50.

10. The aluminosilicate zeolite of claim 1, wherein the aluminosilicate zeolite has a silica-to-alumina ratio of about 25 to about 30.

* * * * *